United States Patent
Lee et al.

(10) Patent No.: US 6,246,872 B1
(45) Date of Patent: Jun. 12, 2001

(54) MOBILE SWITCHING CENTRE AND METHOD FOR HANDLING A DROPPED CONNECTION BETWEEN A MOBILE STATION AND A BASESTATION TRANSCEIVER

(75) Inventors: Henry Lee, Gloucester; Len Lewis, Kanata, both of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/073,442

(22) Filed: May 6, 1998

(51) Int. Cl.[7] ............................. H04M 3/42; H04Q 7/20
(52) U.S. Cl. ..................... 455/414; 455/436; 455/468; 455/426
(58) Field of Search .......................... 455/423, 421, 455/426, 437–446, 458, 459, 432, 433, 517, 414; 370/331, 312, 338

(56) References Cited

U.S. PATENT DOCUMENTS

| 5,153,902 | * | 10/1992 | Buhl et al. ................ 455/456 X |
| 5,369,681 | * | 11/1994 | Boudreau et al. .............. 455/456 X |
| 5,566,225 | * | 10/1996 | Haas ...................................... 455/423 |
| 5,566,236 | * | 10/1996 | MeLampy et al. ................... 379/201 |
| 5,590,177 | * | 12/1996 | Vilmur et al. ........................ 455/436 |
| 5,752,185 | * | 5/1998 | Ahuja ............................. 455/459 X |
| 5,995,830 | * | 11/1999 | Amin et al. ......................... 455/423 |
| 6,032,040 | * | 2/2000 | Choy et al. .......................... 456/414 |

* cited by examiner

Primary Examiner—Tracy Legree

(57) ABSTRACT

A system and method for recovering from a lost connection between a mobile station and a mobile communications system after a traffic channel has been successfully assigned are provided. After the connection is lost, rather than dropping the call altogether, the party on the other end of the call is connected to an announcement. While the announcement is playing, the system pages the mobile station in an effort to re-locate it and re-establish a traffic channel. When a traffic channel is successfully re-established, the call is connected. The connection may be lost during handoff, conversation (normal use), mobile termination or mobile origination for example.

2 Claims, 10 Drawing Sheets

MOBILE SWITCHING CENTRE AND METHOD FOR HANDLING A DROPPED CONNECTION BETWEEN A MOBILE STATION AND A BASESTATION TRANSCEIVER

FIELD OF THE INVENTION

The invention relates to a method and mobile switching centre for handling a dropped connection between a mobile station and a mobile switching centre in a cellular communications system.

BACKGROUND OF THE INVENTION

Mobile communications systems typically consist of a mobile switching centre connected to a number of basestation controllers, each basestation controller controlling a number of basestation transceivers each located in a respective cell. A first connection can be established between a mobile station located in a particular cell and the mobile switching centre by establishing a traffic channel (RF link) between the basestation transceiver in the particular cell, and a corresponding channel from the basestation transceiver through the relevant basestation controller to the mobile switching centre. A call between a mobile terminal and a second terminal (which may be a wireless terminal, a wireline terminal, or an inter-mobile switching centre agent for example) is connected when a second connection from the mobile switching centre to the second terminal is made, and the first and second connections are bridged.

In the normal course of events, a traffic channel is assigned through a traffic channel assignment procedure and then communications over the assigned traffic channel commence. This "normal course of events" includes handoff, conversation mode, mobile origination and mobile termination scenarios. In a handoff, a traffic channel assignment is sent and the mobile starts communicating with a new basestation over a new traffic channel. In conversation mode the mobile simply continues to communicate over the assigned channel. In a mobile origination, a traffic channel is assigned as a result of a user of the mobile originating a call and then communications over the traffic channel commence. In a mobile termination, a traffic channel is assigned as a result of another party making a call to the mobile terminal, and then communications over the assigned traffic channel commence.

In any of the above scenarios, the traffic channel may be lost after the successful completion of the traffic channel assignment. This may be due to failure to connect to the newly assigned traffic channel as in the case of a handoff, mobile origination or mobile termination, or simply due to the failure to maintain communications over the traffic channel after it has been connected. In existing systems, when a traffic channel is dropped in any of the above-identified circumstances, the entire call is torn down meaning that the second connection to the second terminal is also disconnected, and either the caller or the callee must redial the other party's number to be reconnected.

One problem with this situation is that dropped calls and connect failures are annoying to customers. More importantly, any time that a call is dropped or fails to be connected, there exists the possibility that the parties involved will not bother to attempt to reconnect, and this represents lost revenue to the operating companies.

Another drawback with dropped calls is that some of them may be emergency calls such as 911 calls and a person making such a call may not have the opportunity to attempt it again should the call be dropped.

SUMMARY OF THE INVENTION

It is an object of the invention to obviate or mitigate one or more of the above identified disadvantages.

According to a first broad aspect, the invention provides in a communications system, wherein a call connection between a first mobile terminal and a connection entity comprises a first connection over an assigned traffic channel between the mobile terminal and a mobile switching centre and a second connection between the mobile switching centre and the connection entity, wherein said first connection may be lost after successfully assigning said traffic channel, a method of recovering from such a lost first connection comprising the steps of: a) maintaining said second connection; b) paging the first mobile terminal to determine its location; c) establishing a new first connection between the mobile terminal and the mobile switching centre; and d) bridging the second connection with said new first connection thereby re-connecting the call.

According to another broad aspect, the invention provides a mobile switching centre for use in a communications system, wherein a call connection between a first mobile terminal and a connection entity comprises a first connection over an assigned traffic channel between the mobile terminal and the mobile switching centre and a second connection between the mobile switching centre and the connection entity, wherein said first connection may be lost after said traffic channel has been successfully assigned, the mobile switching centre comprising: a) a connection holding mechanism for maintaining said second connection after said first connection is lost; b) a paging mechanism for paging the first mobile terminal to determine its location; c) connection establishment circuitry for coordinating the establishment of a new first connection between the mobile terminal and the mobile switching centre; and d) connection bridging circuitry for bridging the second connection with said new first connection thereby re-connecting the call.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
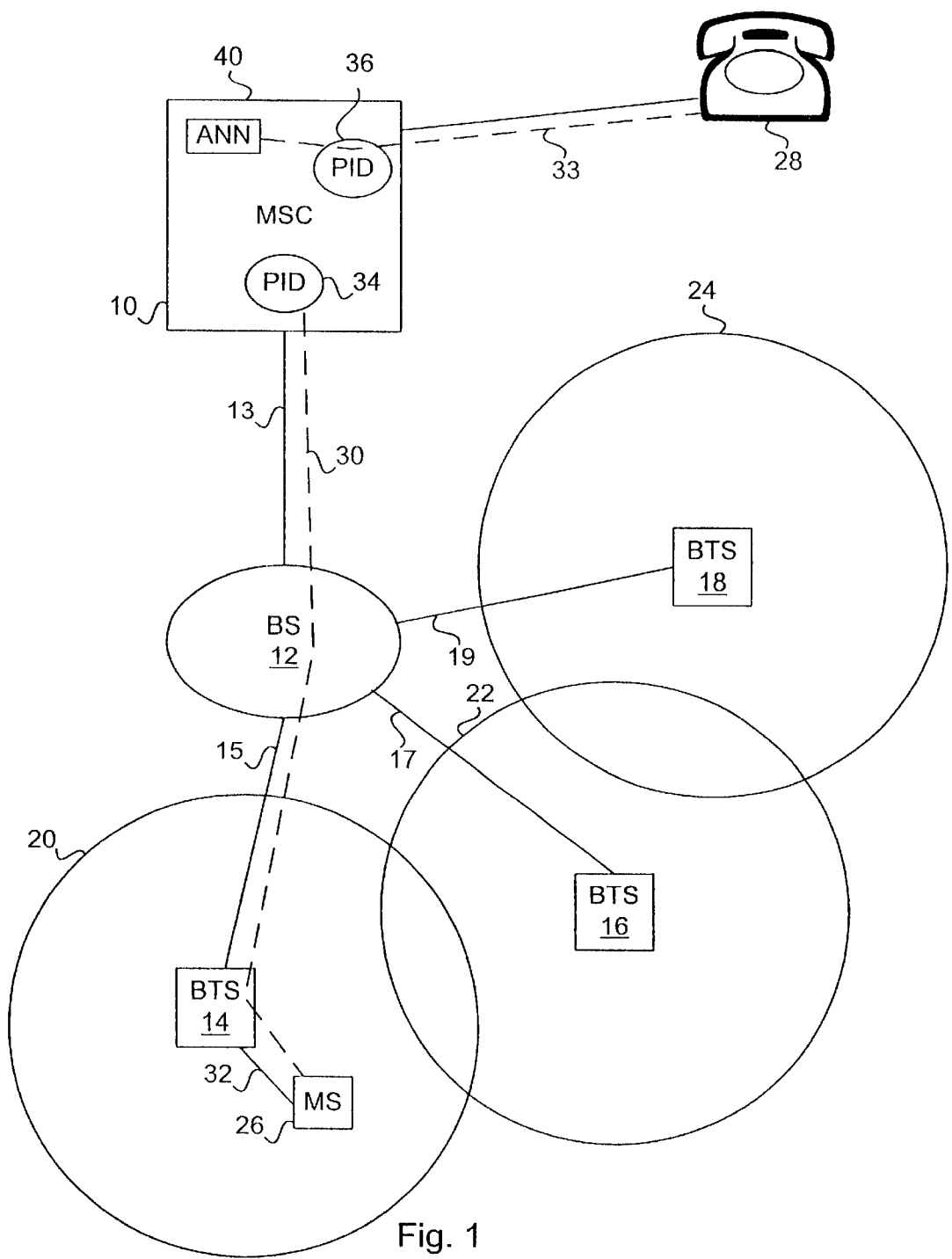
FIG. 1 is a block diagram of a mobile communications system according to an embodiment of the invention.

Referring firstly to FIG. 1, a conventional mobile communications system includes an MSC (mobile switching centre) 10, a plurality of BSs (basestations, only one shown) 12 each connected to the MSC through a respective link 13, and a plurality of BTSs (basestation transceivers, three shown) 14,16,18 for each BS connected to the respective BS through respective links 15,17,19. Each basestation transceiver provides service to mobile stations located inside their respective cells 20,22,24. A single mobile station 26 is shown located inside the cell 20 of one of the basestation transceivers 14. In order to establish a call connection between the mobile station 26 and a second terminal 28, a first connection shown schematically by a dotted line 30 from the mobile station is made which includes a traffic channel over an RF link 32 between the mobile station and the BTS 14, and a channel from the BTS to the MSC 10 on links 15,13. A second connection shown schematically by a dotted line 33 is made from the MSC 10 to the second terminal 28. In the MSC, the first connection 30 is identified by a first PID (process identifier) 34 and the second connection 33 is identified by a second PID 36. A connection between the mobile terminal 26 and the second terminal 28 is made when the first and second connections 30,33 are bridged.

When a connected mobile station 26 moves from one cell to another, for example from cell 20 to cell 22 it must break its communications with the BTS 14 involved in the existing connection (source BTS) and establish communications with the BTS (target BTS) 16 of the new cell 22 in a process known as handoff. A handoff can be classified as either a soft or a hard handoff. A hard handoff occurs when the mobile station 26 breaks communication with the source BTS 14 before it establishes communications with the target BTS 16. A soft handoff occurs when the mobile station 26 establishes communications with the target basestation 16 before breaking communications with the source basestation 14.

During hard handoff, when the mobile station 26 is directed to tune to an assigned target traffic channel, it ceases communications over its current traffic channel. After the mobile station ceases communications over its current channel, if the mobile is unable to tune to the target traffic channel, the mobile station is no longer communicating with any basestation, and thus, it is eventually dropped from the call. The second terminal 28 is also dropped and the resources allocated to both the first and second PIDs 34,36 are deallocated.

During conversational or normal use in a non-handoff situation, the mobile station 26 may cease to be properly tuned to its currently assigned traffic channel. In such situations, in conventional systems after a certain time period, the call is again dropped.

Finally, during mobile origination and mobile termination there is a signalling phase during which the location of the mobile station 26 is determined, and the particular traffic channel to be used is assigned. Under normal circumstances, the mobile station then tunes to the particular traffic channel and a connection is made. However, in some cases, the mobile station 26 fails to be tuned to the particular traffic channel. In conventional systems, the call is again dropped.

According to an embodiment of the invention, a system and method of recovering from a hard handoff failure are provided. During a hard handoff, when the mobile station 26 is instructed to tune to a target traffic channel of the target basestation 16, it first ceases communications with the source basestation 14 and then attempts to establish communication with the target basestation 16. In the event that the mobile station 26 is unable to tune to the target traffic channel, the MSC 10 is notified by the target basestation 16 that the mobile station has not tuned to the target traffic channel. At this point, the MSC 10 deallocates the source basestation radio resource.

A hard handoff recovery mechanism provided by this embodiment of the invention which is then executed in an effort to reconnect the mobile station 26 without dropping the call will now be described by way of overview. Firstly, the second terminal 28 is connected to a connection holding mechanism which may for example be an announcement 40 (the announcement played on some type of announcement playing mechanism). While the announcement 40 is playing, the MSC 10 pages the mobile station 26. If the page fails, the MSC 10 may initiate a re-page. The cells specified in the page are based on one or more of the following:

target cells used in the hard handoff;

cell information in the VLR (visitor location registry); and existing paging algorithms for mobile termination.

Existing paging algorithms include zone paging and broadcast paging among others.

When the mobile station 26 is paged, a special ringing tone is preferably applied to the mobile station and/or a message text is displayed on the mobile station to indicate that the mobile station is being reconnected to an existing call. When the mobile station answers, it is connected to the call, the other party is disconnected from the announcement 40, and is reconnected to the call.

Figure 2A:
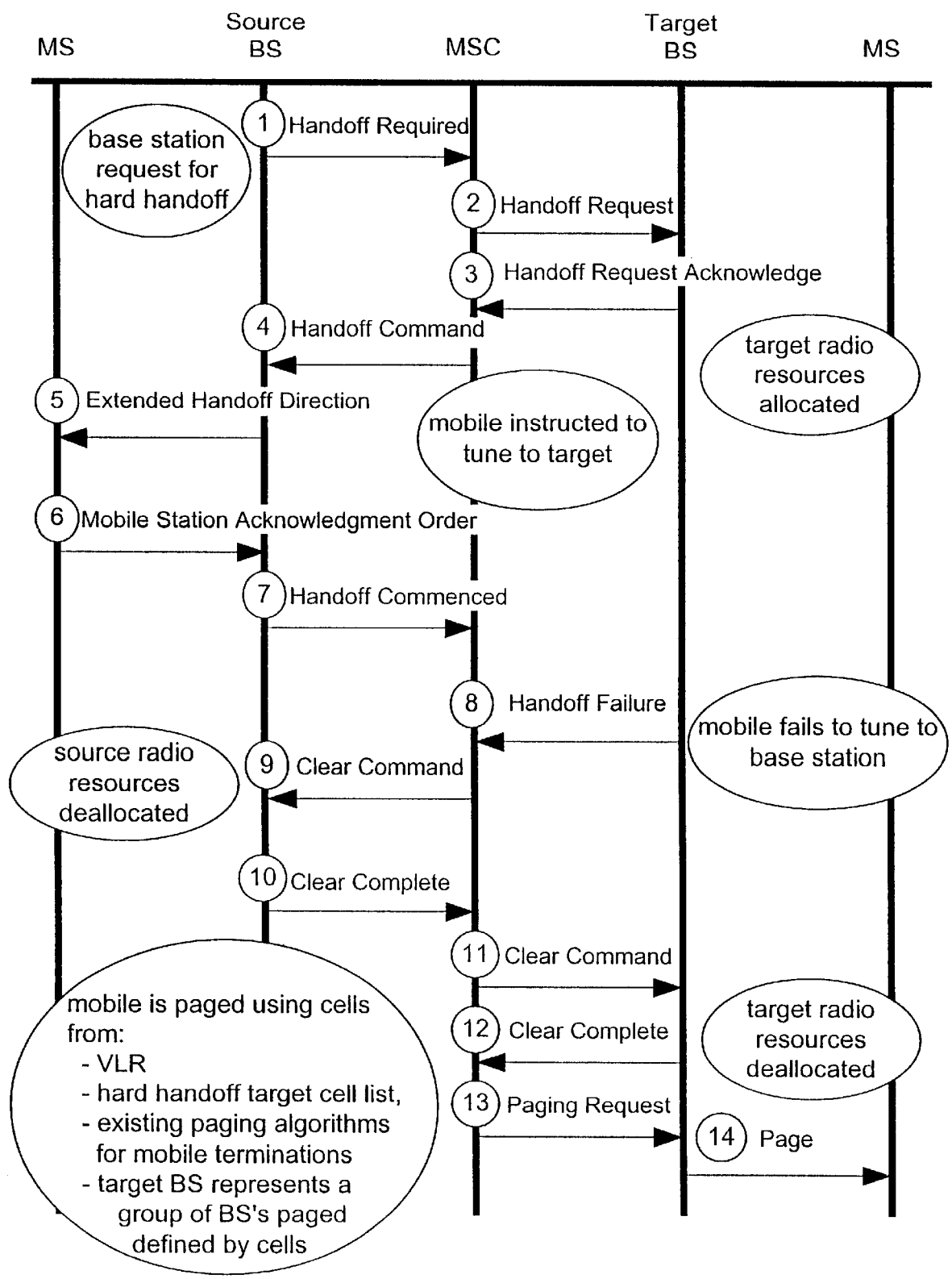
FIGS. 2A and 2B is a message flow diagram for recovering from a connection dropped during handoff according to an embodiment of the invention.
Figure 2B:
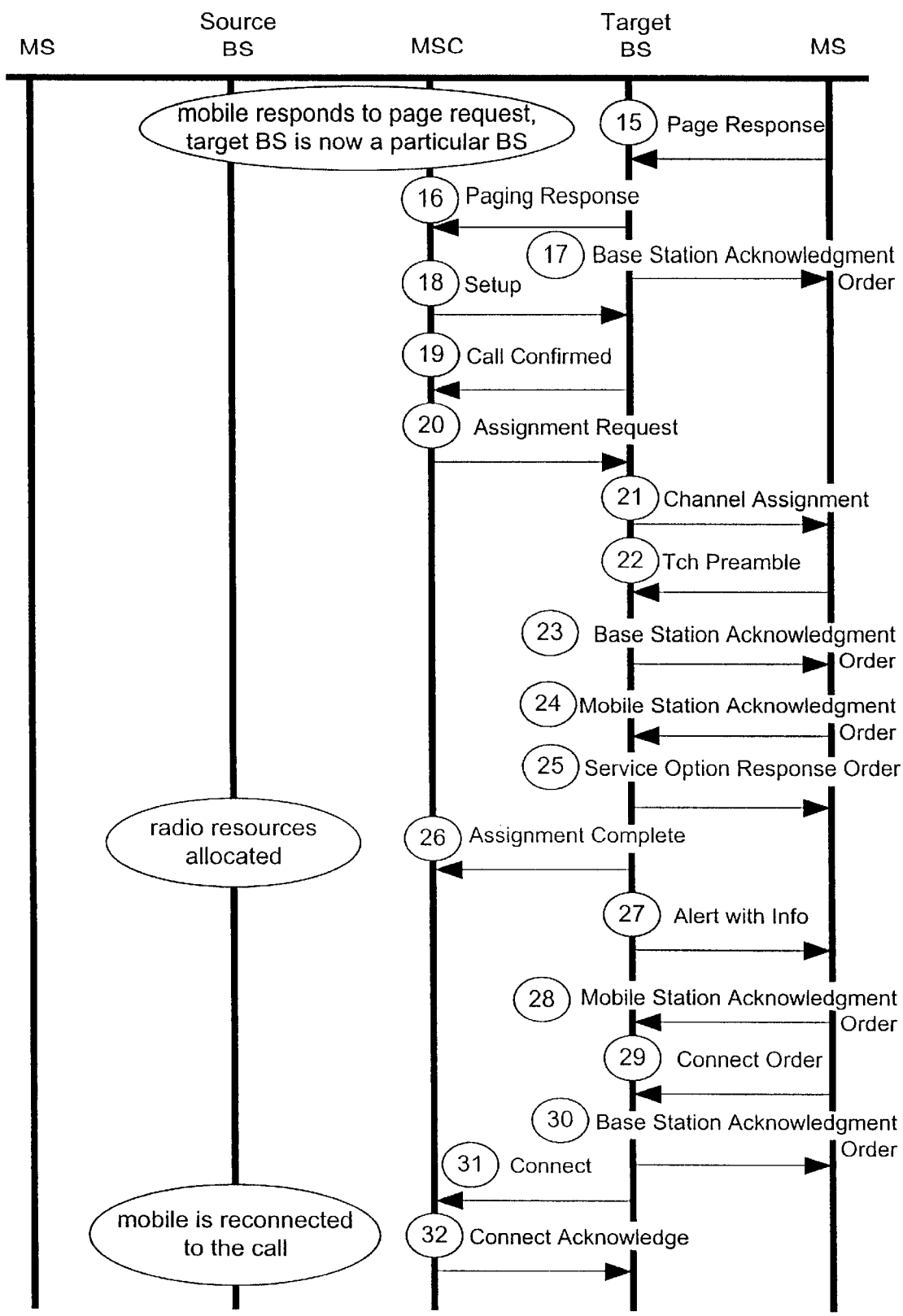

A detailed implementation of the above summarized hard-handoff recovery mechanism will now be described with reference to FIG. 2 (which includes FIGS. 2A and 2B) in which it is assumed that the interface between the mobile station 26 and the basestation 14 is IS-95A, and the interface between the basestation and the mobile switching centre 10 is TSB-80. The bold text highlights the modifications to the existing handoff and paging message flows. FIG. 2 contains a message flow diagram in which the various components in the system are represented by vertical time lines, one each for the MS when in communication with the source BS, source BS, MSC, target BS, and the MS when in communication with the target BS. A message from one component to another is represented by a numbered and labelled arrow from one of the time lines to another. The messages will now be described in sequence:

Message 1. The basestation sends a Handoff Required message with a target cell list to the MSC to request a hard handoff.

Message 2. The MSC sends to the target basestation a Handoff Request message with a target cell list based on the received target cell list in the Handoff Required message.

Message 3. The target basestation allocates the radio resource and sends to the MSC a Handoff Request Acknowledge message with the target cell(s) for which the radio resources have been successfully allocated.

Message 4. The MSC sends a Handoff Command message to the source basestation to convey the information received in the Handoff Requested Acknowledge message.

Message 5. The source basestation sends an Extended Handoff Direction message to the mobile to instruct it to tune to the target basestation.

Message 6. The mobile sends a Mobile Station Acknowledgment Order message to the source basestation confirming the receipt of the Extended Handoff Direction message.

Message 7. The source basestation sends to the MSC a Handoff Commenced message indicating that the mobile has been instructed to tune to the target basestation and that it is no longer communicating with the source basestation.

Message 8. The mobile station is unable to tune to the target basestation. When the target basestation timer expires it sends a Handoff Failure message to the MSC. The MSC connects the other party (not shown) to an announcement.

Message 9. The MSC sends a Clear Command message to the source basestation to clear the source basestation radio resource.

Message 10. The BS sends a Clear Complete message to the MSC when the radio resources have been cleared.

Message 11. The MSC sends a Clear Command message to the target basestation to clear the target radio resources.

Message 12. The target basestation sends a Clear Complete message to the MSC when the radio resources have been cleared.

Message 13. The MSC builds a cell list based on the target cell list used in the hard handoff, based on the VLR, or using one of the existing paging algorithms for terminations. The MSC sends a Paging Request message to one or more basestations with the cell list.

Message 14. The basestations send a Page message containing the mobile station address over the paging channel.

Message 15. The mobile station receives the Page message from one of the basestations and acknowledges the Page message by sending a Page Response message to the basestation.

Message 16. The basestation sends a Paging Response message to the MSC.

Message 17. The basestation sends a Basestation Acknowledgement Order message to the mobile station to acknowledge receipt of the Page Response.

Message 18. The MSC sends a Setup message (contained in a SCCP Connection Confirmed message) to the basestation containing all the required information necessary to initiate terminating call establishment.

Message 19. Upon receipt of the Setup message, the basestation sends a Call Confirmed message to the MSC.

Message 20. The MSC sends an Assignment Request message to the target basestation with a special ringing tone and/or message text. The target basestation sets up the radio resources.

Message 21. The target basestation sends a Channel Assignment message to the mobile station with a special ringing tone and/or message text.

Message 22. The mobile station begins sending the traffic channel preamble over the designated reverse channel.

Message 23. Once the basestation acquires the reverse traffic channel, it sends a Basestation Acknowledgment Order message to the mobile station.

Message 24. The mobile station acknowledges the receipt of the Basestation Acknowledgment Order message by sending a Mobile Station Acknowledgment Order to the basestation.

Message 25. The basestation sends a Service Option Response Order message to the mobile station specifying the service configuration for the call by way of a service option number. The mobile station begins processing traffic in accordance with the specified service option number.

Message 26. After the radio traffic channel and terrestrial circuit have both been established and fully interconnected, the basestation sends the Assignment Complete message to the MSC.

Message 27. The basestation sends the Alert With Information message to the mobile station with a special ringing tone and/or message text.

Message 28. The mobile station acknowledges the reception of the Alert With Information message by sending a Mobile Station Acknowledgment Order message to the basestation.

Message 29. The call is answered at the mobile station, a Connect Order message is sent to the basestation.

Message 30. The basestation acknowledges the Connect Order message with the Basestation Acknowledgement Order over the forward traffic channel.

Message 31. The basestation sends a Connect message to the MSC to indicate that the mobile is answered. The MSC disconnects the other party from the announcement and reconnects the other party and the mobile to the call.

Message 32. The basestation acknowledges receipt of the Connect message by sending a Connect Acknowledge message to the MSC.

Figure 3:
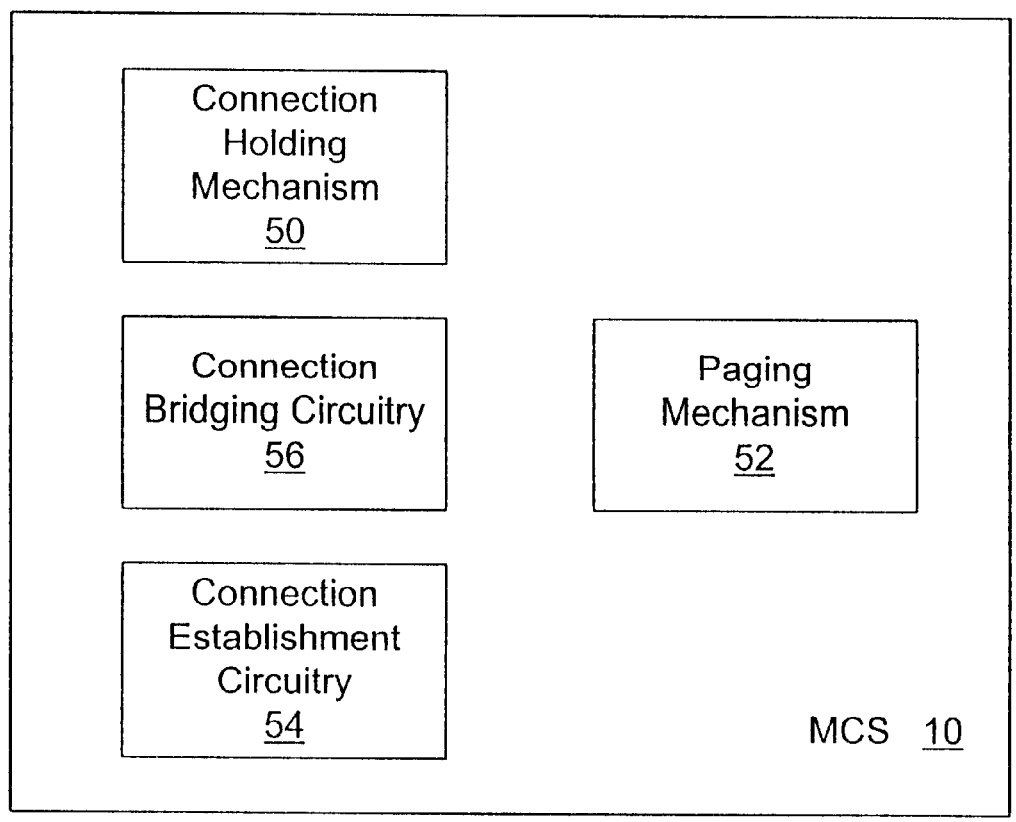
FIG. 3 is a functional block diagram of a mobile switching centre according to an embodiment of the invention.

Referring now to FIG. 3, a mobile switching centre according to an embodiment of the invention which is adapted to participate in the above described method comprises a connection holding mechanism 50, a paging mechanism 52, connection establishment circuitry 54, and connection bridging circuitry 56.

The connection holding mechanism is for maintaining the second connection after the first connection is lost. The paging mechanism is for paging the first mobile terminal to determine its location. In the above described example, the second connection between the mobile switching centre and the second terminal is maintained by connecting it to an announcement. More generally, any connection holding mechanism may be used to achieve this. Such a connection holding mechanism may be realized in hardware, software, or a combination of hardware or software.

The connection establishment circuitry is for coordinating the establishment of a new first connection between the mobile terminal and the mobile switching centre.

The connection bridging circuitry is for bridging the second connection with said new first connection thereby re-connecting the call.

Both the connection establishment circuitry and the connection bridging circuitry may be realized in software, hardware, or a combination of software and hardware.

Interface Modifications

This section describes the interface changes required for a CDMA system using the TSB-80 BS to MSC and IS-95A BS to MS interfaces.

The paging process is the same as for mobile termination with the exception that a special ringing tone and/or message text is applied at the mobile. Changes are required in the messaging between the MSC and BS and between the BS and MS.

Basestation to Mobile Switching Centre Messages (TSB-80)

In Table I below, the unmodified existing information elements of the Assignment Request message are shown in plain text. Existing elements which have been modified are shown in italics. In addition, an information element which is being added to the definition of the message is shown in bold.

TABLE I

Information Element for Assignment Request Message

Channel Type

Signalling Type
Priority
Circuit Identity
Cell Identifier
Channel Number
Encryption Information
Service Option
Transcoder Mode
Signal
Calling Party ASCII Number
Display In the Assignment Request message, the "Signal" information element is modified. A new ringing tone value is defined to identify the fact that a reconnect is being performed. The "Display" information element is added to the message definition. The Display information element contains the message text to be applied to the mobile display.
Mobile Station To Basestation Messages (IS-95A)

In Table II below the existing information elements of the Alert With Information message are shown. The modified information elements are shown in italics.

TABLE II

Information Elements for Alert With Information Message

Encryption
Information Record

Display
Called Party Number
Calling Party ASCII Number
Signal

Signal

In the Alert With Information message, the "Signal" information element is modified. A new ringing tone value is defined to cause a special ringing tone to sound identifying the fact that a reconnect is being performed.

The above described message flow is specific to the case where a recovery from a dropped connection during handoff is to be performed. The example includes messages which are particular to the IS-95A and TSB-80 protocols. However, it is to be understood that this and other embodiments or the invention are not limited to application in the context of these protocols.

In the above described example, embodiments of the invention provide a system and method for dealing with a first connection which is dropped during handoff. In such a case, a first connection between the mobile station and the MSC through the target BS fails to be connected and is thus lost, and the MS is eventually connected to a BS (which may or may not be the original target BS) over a new first connection. More generally, embodiments of the invention can be applied to recovering from a first connection which is lost during conversation or during mobile origination or mobile termination. During normal use, the first connection may be dropped due to interference for example. A new connection to the MSC is established which may be through the same BS or through a different BS, this being dependent upon which basestation the Page Response message is received from. Similarly during mobile origination or mobile termination, the first connection may fail to be connected and thus become lost. A new first connection to the MSC is established which may be through the same BS or through a different BS again depending upon which basestation the Page Response message is received from.

Figure 4A:
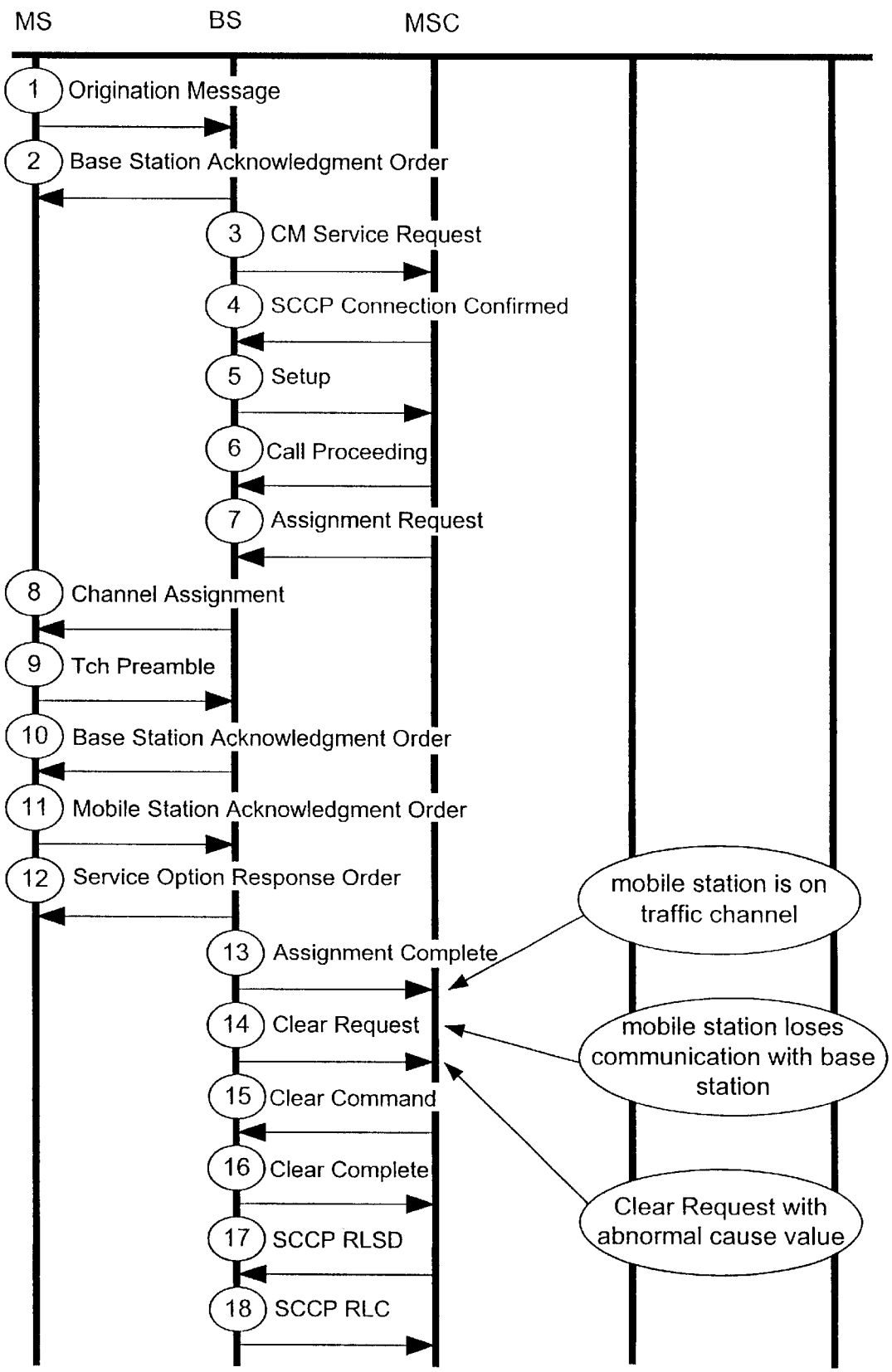
FIGS. 4A and 4B is a message flow diagram for recovering from a traffic channel dropped during mobile origination according to an embodiment of the invention.
Figure 4B:
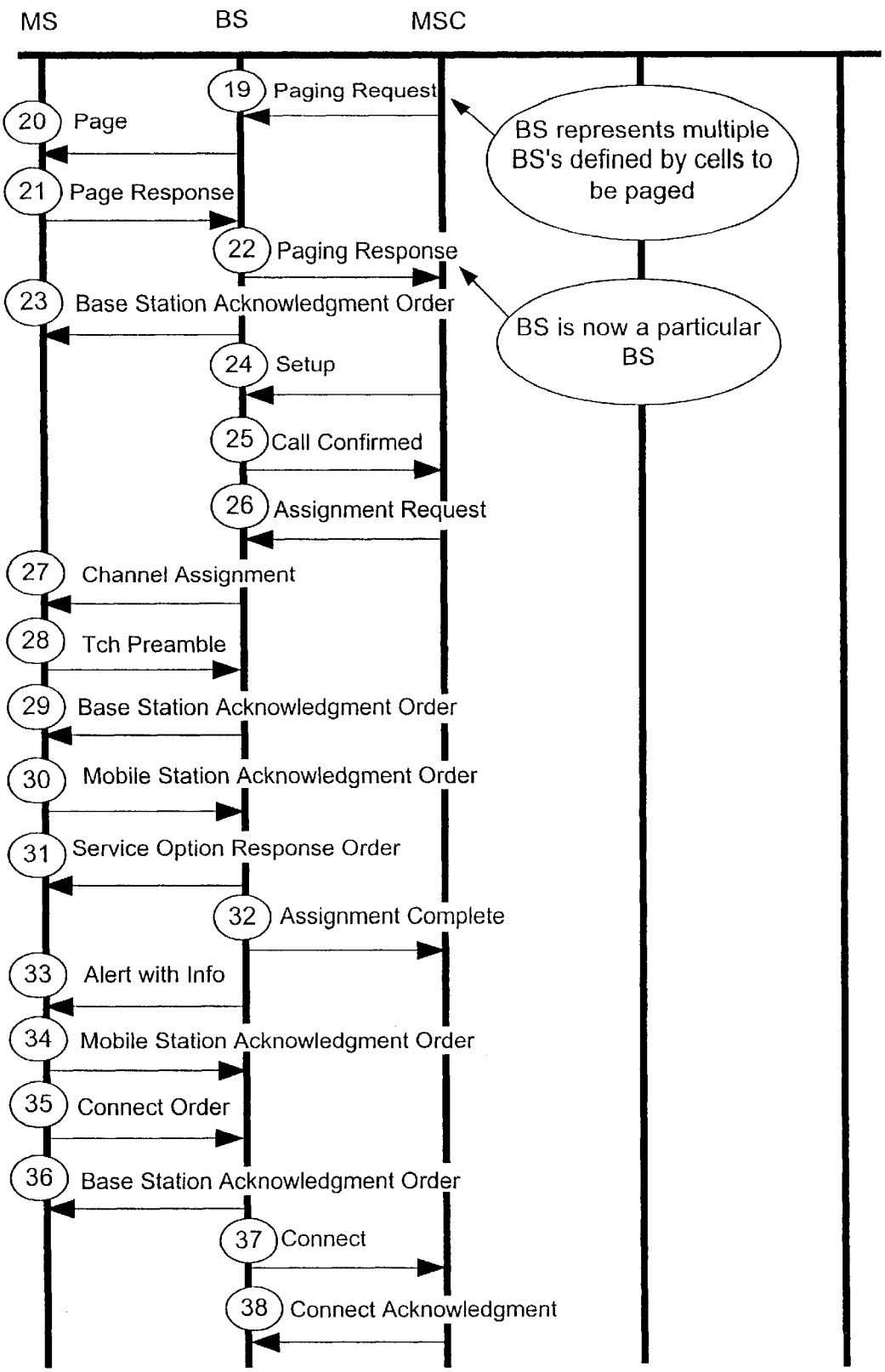

According to another embodiment of the invention, a system and method for the recovery from a dropped traffic channel during mobile origination are provided, and will be described with reference to FIG. 4 which is a message flow diagram.

Message 1. The mobile stations transmits an Origination message with layer 2 acknowledge over the access channel of the air interface to the basestation to request service.

Message 2. The basestation acknowledges the receipt of the Origination message with a Basestation Acknowledgment Order to the mobile station.

Message 3. The basestation constructs a CM Service Request message, places it in a Complete Layer 3 Information message, and sends the message of the MSC.

Message 4. The MSC uses the SCCP Connection Confirmed primitive without (layer 3) user data to complete establishment of the signalling channel connection. The MSC sends the SCCP Connection Confirmed message to the basestation.

Message 5. Once the signalling connection is confirmed, the basestation sends a Setup message to the MSC, providing the necessary information for call setup to the called party.

Message 6. The MSC returns a Call Proceeding message to the basestation to indicate that the call establishment has been initiated in the network and that additional call establishment information will no longer be accepted.

Message 7. The MSC sends an Assignment Request message to the basestation to request assignment of radio resources and traffic channel.

Message 8. The basestation sends a Channel Assignment message over the paging channel of the radio resource to initiate the establishment of a radio traffic channel.

Message 9. The mobile station begins sending the traffic preamble over the designated reverse traffic channel.

Message 10. Once the basestation acquires the reverse traffic channel, it sends a Basestation Acknowledgment Order message to the mobile station over the forward traffic channel.

Message 11. The mobile station acknowledges the reception of the Basestation Acknowledgment Order message by transmitting the Mobile Station Acknowledgement Order message and by sending null traffic channel data over the reverse traffic channel.

Message 12. The basestation then sends the Service Option Response Order message to the mobile station specifying the service configuration for the call. The mobile station begins precessing traffic.

Message 13. After the radio traffic channel and terrestrial circuit have been both established and fully interconnected, the basestation send the Assignment Complete message to the MSC.

Message 14. The mobile station loses communication with the basestation. The basestation sends a Clear Request message with an abnormal cause value to release the call.

Message 15. Upon receipt of the Clear Request message, the MSC sends a Clear Command message to the basestation to instruct the basestation to release the associated dedicated resource.

Message 16. In response to the Clear Command message the basestation releases the associated dedicated resource and returns a Clear Complete message to the MSC.

Message 17. The MSC sends the SCCP RLSD message to the basestation to release the SCCP connection.

Message 18. In response to the SCCP RLSD message, the basestation releases the SCCP connection and returns a SCCP RLC message to the MSC.

Message 19. Description for messages 19 through 38 is the same as in the hard handoff message flow (message 13 through 32) described previously with reference to FIG. 2.

Figure 5A:
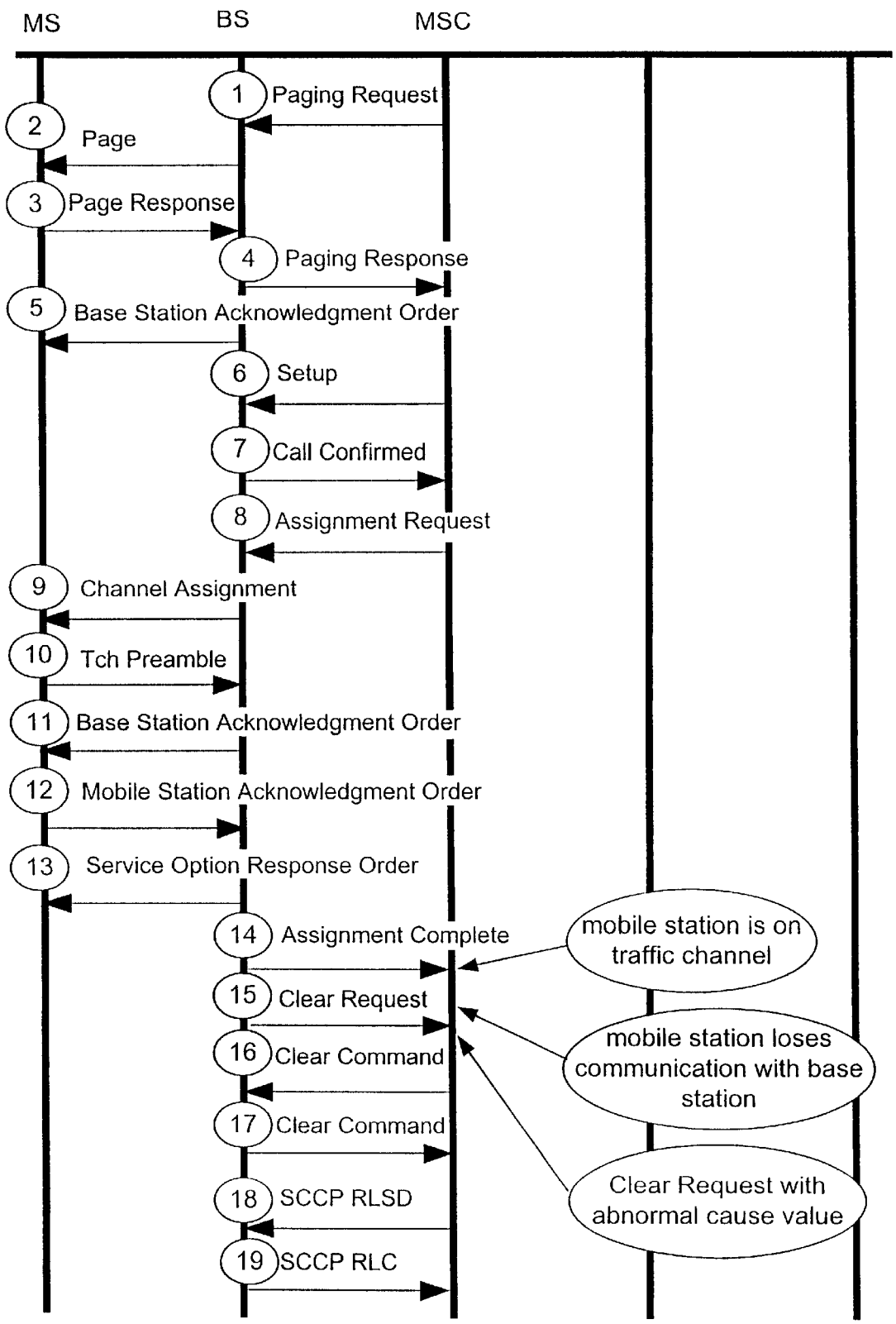
FIGS. 5A and 5B is a message flow diagram for recovering from a traffic channel dropped during mobile termination according to an embodiment of the invention.
Figure 5B:
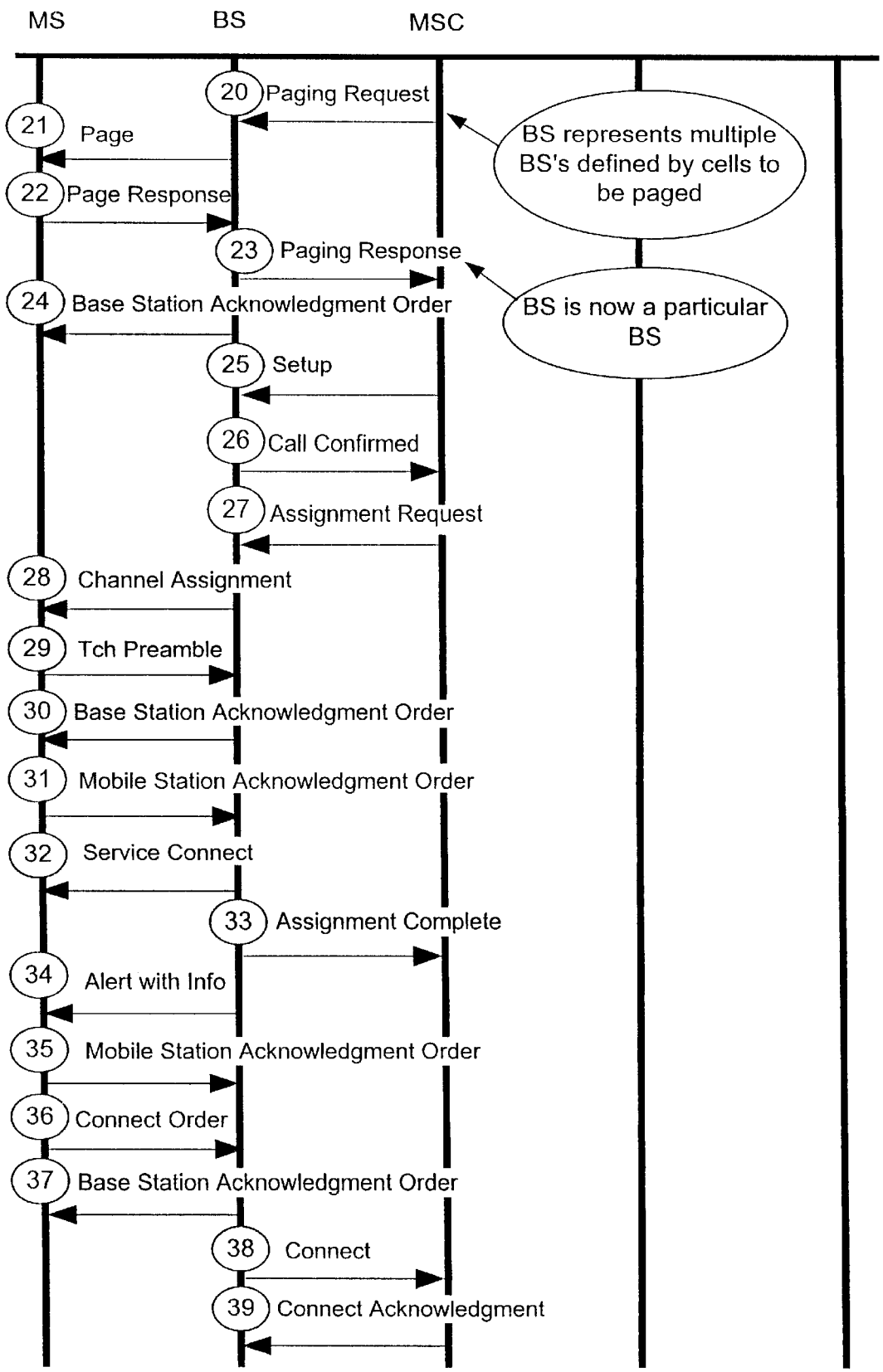

According to another embodiment of the invention, a message flow for the recovery from a dropped channel during mobile termination is provided, and will be described with reference to FIG. 5.

Message 1. The MSC determines that an incoming call terminated to a mobile within its serving region and sends a Paging Request message to the basestation to initiate a mobile terminated call setup scenario.

Message 2. The basestation issues a Page message containing the mobile station address over the paging channel.

Message 3. The mobile station acknowledges the page by transmitting a Page Response message over the access channel.

Message 4. The basestation constructs a Paging Response message and sends the message to the MSC.

Message 5. The basestation acknowledges the receipt of the Page Response message from the mobile station with a Basestation Acknowledgment Order message to the mobile station.

Message 6. The MSC sends the Setup message to the basestation to initiate terminating call establishment.

Message 7. Upon receipt of the Setup message (contained in the SCCP Connection Confirmed message), the basestation sends the Call Confirmed message to the MSC.

Message 8. The MSC sends an Assignment Request message to the basestation to request assignment of radio resources and a traffic channel.

Message 9. The basestation sends a Channel Assignment message over the control channel of the radio interface to initiate the establishment of the radio traffic channel.

Message 10. The mobile station begins sending the traffic channel preamble over the designated reverse traffic channel.

Message 11. Once the basestation acquires the reverse traffic channel, it sends the Basestation Acknowledgment Order to the mobile station over the forward traffic channel.

Message 12. The mobile station acknowledges the reception of the Basestation Acknowledgment Order message by transmitting the Mobile Station Acknowledgment Order.

Message 13. The basestation sends the Service Option Response Order message to the mobile station specifying the service configuration for the call.

Message 14. After the radio traffic channel terrestrial circuit have both been established, the basestation sends the Assignment Complete message to the MSC.

Message 15. The mobile station loses communication with the basestation. The basestation sends a Clear Request message with an abnormal cause value to release the call.

Message 16. Upon receipt of the Clear Request message, the MSC sends a Clear Command message to the basestation to instruct the basestation to release the associated dedicated resource.

Message 17. In response to the Clear Command message, the basestation releases the associated dedicated resource and returns a Clear Complete message to the MSC.

Message 18. The MSC sends the SCCP RLSD message to the basestation to release the SCCP connection.

Message 19. In response to the SCCP RLSD message, the basestation releases the SCCP connection and returns a SCCP RLC message to the MSC.

Message 20. Description for messages 20 through 39 is the same as in the hard handoff message flow (messages 13 through 32) described previously with reference to FIG. 2.

Figure 6A:
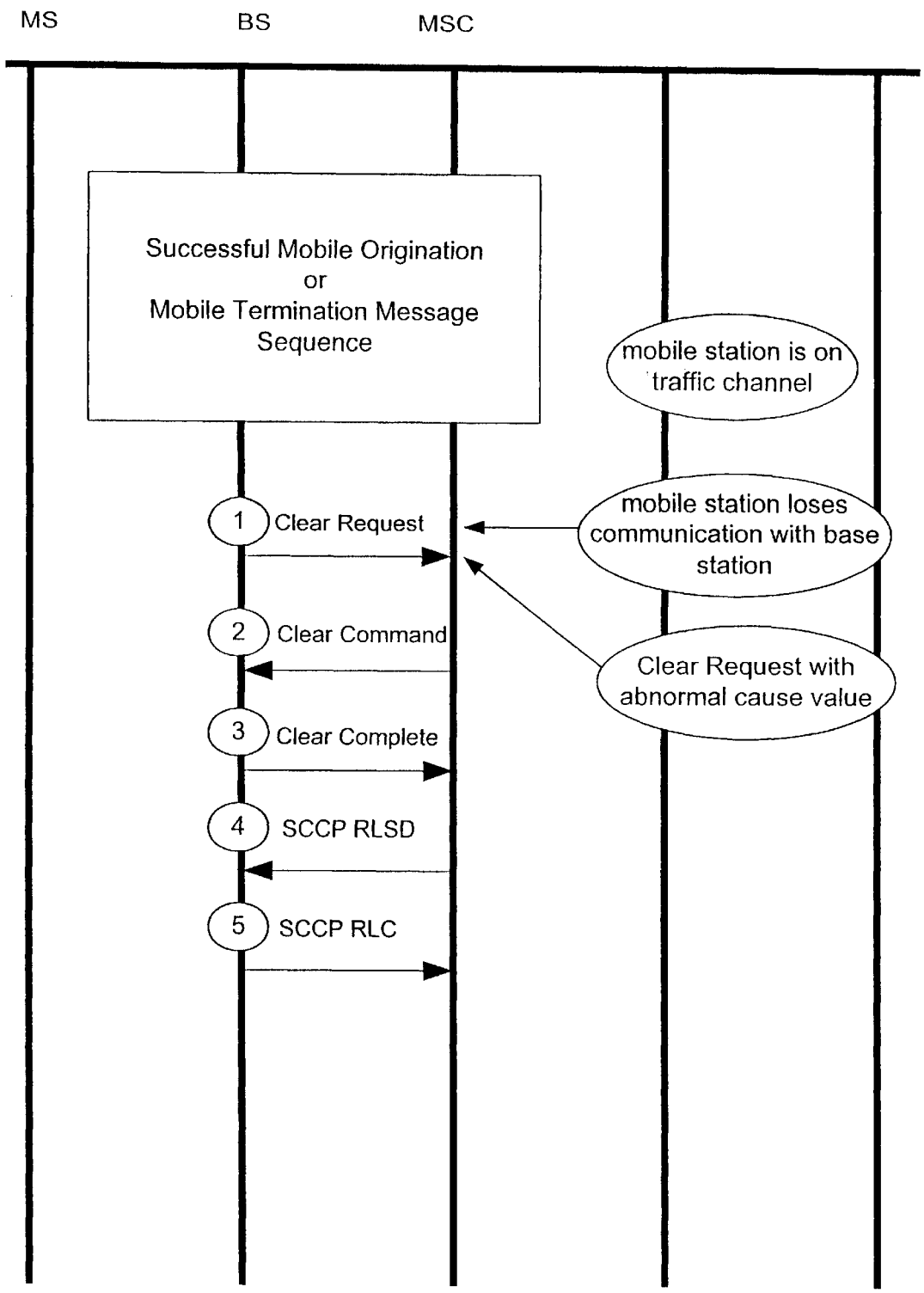
FIGS. 6A and 6B is a message flow diagram for recovering from a traffic channel dropped during normal conversation according to an embodiment of the invention.
Figure 6B:
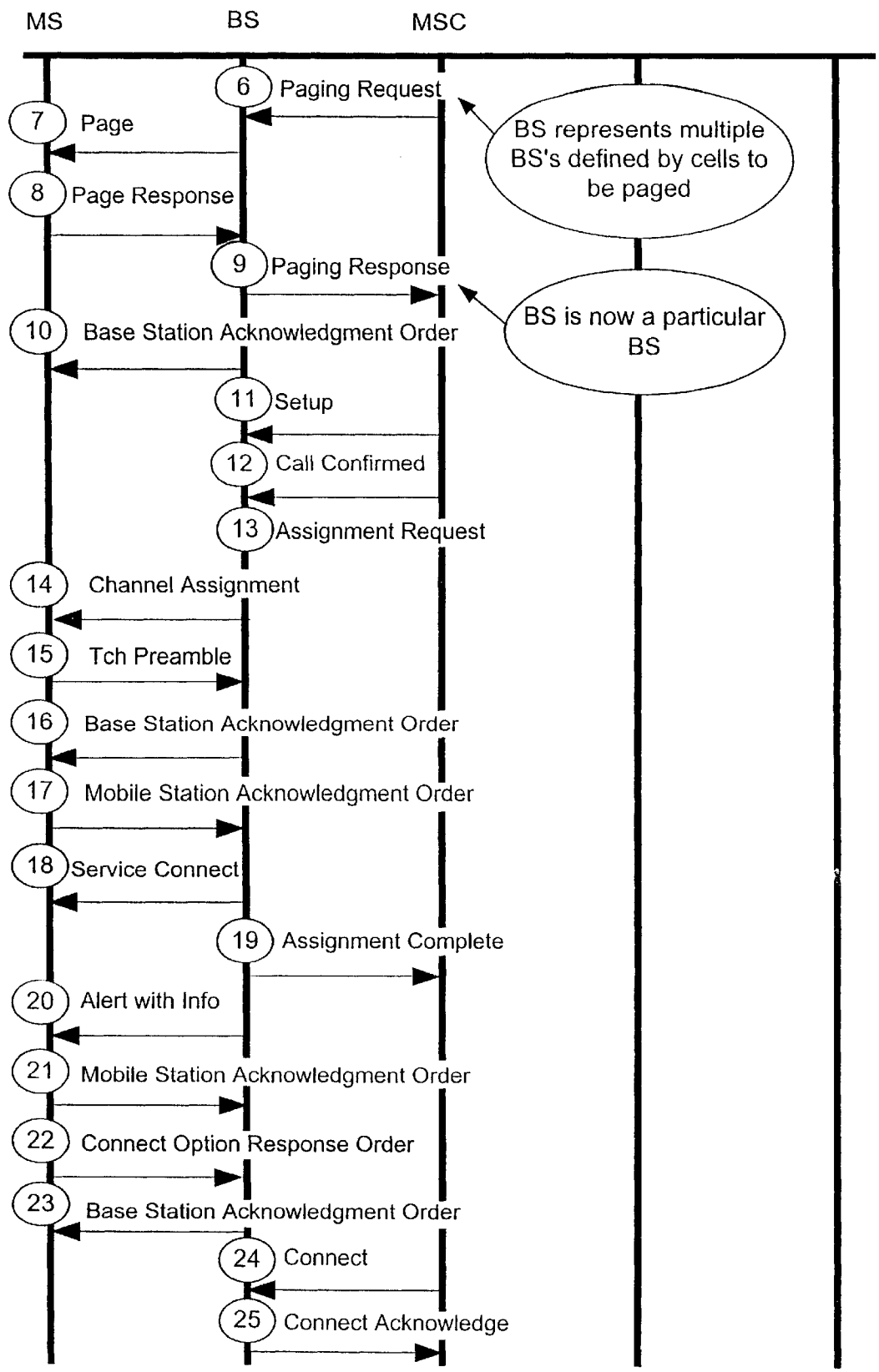

According to another embodiment of the invention, a message flow for the recovery from a dropped channel during normal conversation is provided, and will be described with reference to FIG. 6.

Message 1. The mobile station and basestation lose communication. The basestation sends a Clear Request message with an abnormal cause value to release the call.

Message 2. Upon receipt of the Clear Request message, the MSC sends a Clear Command message to the basestation to instruct the basestation to release the associated dedicated resource.

Message 3. In response to the Clear Command message, the basestation releases the associated dedicated resource and returns a Clear Complete message to the MSC.

Message 4. The MSC sends the SCCP RLSD message to the basestation to release the SCCP connection.

Message 5. In response to the SCCP RLSD message, the basestation releases the SCCP connection and returns a SCCP RLC message to the MSC.

Message 6. Description for messages 6 through 25 is the same as in the hard handoff message flow (messages 13 through 32) described previously with reference to FIG. 2.

Preferably, the re-paging methods and systems provided by embodiments of the invention are invoked as a function of considerations such as the importance of the call, capacity considerations, and handoff failures. For example, a dropped 911 call should be given a high priority for re-establishment. On the other hand, if a hardware outage results in thousands of dropped calls, it may not be desirable to repage all of the mobiles involved in the dropped calls.

In the illustrated examples, a second terminal is connected through a second connection directly to the MSC communicating with the mobile station. It is to be understood that the second terminal may be any connection entity including for example a wireless terminal, a wireline terminal, an inter-MSC agent, or another switch. Furthermore, it is be understood that the "second connection" may be any type of connection between a connection entity and the MSC including a wireless connection, a wireline connection to another MSC, a wireline connection to a PSTN switch, or combinations of all of the above and/or other connection types.

It is to be noted that this invention is used when the traffic channel has been successfully assigned and the mobile station loses communication with the basestation. This is to be differentiated from Page Request time-out for call terminations and Assignment Request failures for call origination and terminations. Error handling for these two scenarios is already covered in the TSB-80 specification.

Numerous modifications and variations of the present invention are possible in light of the above teachings. It is therefore to be understood that within the scope of the appended claims, the invention may be practised otherwise than as specifically described herein.

We claim:

1. In a communications system, wherein a call connection between a first mobile terminal and a connection entity comprises a first connection over an assigned traffic channel between the mobile terminal and a mobile switching centre and a second connection between the mobile switching centre and the connection entity, wherein said first connection may be lost after successfully assigning said traffic channel, a method of recovering from such a lost first connection comprising the steps of:

a) maintaining said second connection;

b) paging the first mobile terminal to determine its location;

c) establishing a new first connection between the mobile terminal and the mobile switching centre;

d) after establishing a new first connection between the mobile terminal and the mobile switching centre, alerting the mobile terminal with a special ringing tone and/or message text; and e) bridging the second connection with said new first connection thereby re-connecting the call after the call is answered by the mobile terminal;

wherein said first connection was lost during a handoff;

wherein in said step of paging the mobile terminal, the mobile terminal is paged in a plurality of cells defined by a target cell list generated during handoff.

2. A mobile switching centre for use in a communications system, wherein a call connection between a first mobile terminal and a connection entity comprises a first connection over an assigned traffic channel between the mobile terminal and the mobile switching centre and a second connection between the mobile switching centre and the connection entity; the mobile switching centre comprising:

a handoff mechanism for coordinating a handoff to a target cell within a list of target cells identified as being suitable candidates for handoff;

a connection recovery mechanism for recovering said first connection after it is lost after said traffic channel has been successfully assigned during handoff, the connection recovery mechanism comprising:

a) a connection holding mechanism for maintaining said second connection after said first connection is lost;

b) a paging mechanism for paging the first mobile terminal to determine its location in cells of said list of target cells;

c) connection establishment circuitry for coordinating the establishment of a new first connection between the mobile terminal and the mobile switching centre;

d) means for alerting the mobile terminal with a special ringing tone and/or message text when a new second connection is ready to be established; and e) connection bridging circuitry for bridging the second connection with said new first connection after the call is answered by the mobile terminal thereby re-connecting the call.

* * * * *